United States Patent [19]
Ferguson

[11] 3,985,157
[45] Oct. 12, 1976

[54] ADJUSTABLE REGULATOR VENT COVER

[75] Inventor: Robert J. Ferguson, Marshall, Mich.

[73] Assignee: Progressive Dynamics, Inc., Marshall, Mich.

[22] Filed: May 21, 1975

[21] Appl. No.: 579,474

[52] U.S. Cl. ................................ 137/801; 137/505
[51] Int. Cl.² ......................................... F16K 45/00
[58] Field of Search ............... 137/505, 505.11, 801, 137/615, 561; 251/154, 155; 222/526, 533, 566, 567, 568, 570; 285/272, 273, 275

[56] References Cited
UNITED STATES PATENTS

| | | | |
|---|---|---|---|
| 1,607,096 | 11/1926 | Mueller | 285/273 X |
| 1,844,523 | 2/1932 | Peck | 137/801 |
| 2,302,284 | 11/1942 | Abbott | 137/505.11 X |
| 2,937,658 | 5/1960 | Stewart | 137/505 |
| 2,968,314 | 1/1961 | Whitworth | 137/505 X |
| 3,705,599 | 12/1972 | Sheward | 137/505.11 X |
| 3,747,629 | 7/1973 | Bauman | 137/505 X |

*Primary Examiner*—William R. Cline
*Attorney, Agent, or Firm*—Beaman & Beaman

[57] ABSTRACT

A vent cover for gas pressure regulators exposed to adverse weather conditions wherein the vent cover is mounted upon the vented neck of a gas regulator and is rotatably adjustable relative to the neck such that a vent opening defined in the cover may always be oriented downwardly regardless of the horizontal orientation of the regulator neck during installation. The downward orientation of the vent cover opening removes the possiblity of the regulator venting being rendered inoperable due to adverse weather conditions, such as icing.

15 Claims, 8 Drawing Figures

ADJUSTABLE REGULATOR VENT COVER

BACKGROUND OF THE INVENTION

The invention pertains to vent covers for gas pressure regulators.

Gas pressure regulators, such as used to regulate, and reduce, the gas pressure of natural gas, or liquid petroleum gas, received from a relatively high pressure supply must be vented. The venting occurs on the side of the pressure regulating diaphragm not exposed to the gas, and the venting is necessary to allow the diaphragm to move freely without causing a vacuum or pressure condition within the vented cavity as well as allowing an escape for gas that would be released from the relief valve in case an over pressure condition was obtained at the outlet of the regulator. The venting of gas pressure regulators has taken a number of forms, and U.S. Pat. Nos. 2,937,658; 2,968,314 and 3,747,629 disclose various types of venting arrangements.

With gas pressure regulators mounted so as to be directly exposed to the weather, such as regulators commonly used with liquified petroleum gas supply tanks, there is the possibility that the regulator vent may become obstructed by foreign matter, dirt, water or ice so as to render the venting inoperative producing a potentially dangerous situation.

Regulators for liquified petroleum tanks, particularly when used with recreational vehicles, may be mounted in a variety of positions. Depending on the location of the supply tank, and the supply conduits to the vehicle gas users, the regulator inlet and outlet ports are positioned so as to best accommodate the particular situation, and when the regulator vent position is determined by the regulator manufacturer, it is very possible that the vent, when the regulator is installed, will be positioned in such a manner as to be susceptible to obstruction by dirt, rain, or ice accumulating on the regulator.

To require that the regulator be mounted in a particular orientation which best protects a pre-positioned vent is objectionable as such requirement unduly limits the mode of installation of the regulator, and clearance conditions often dictate the manner in which the regulator has to be mounted.

Current safety regulations require that gas regulators exposed to the weather be capable of functioning under all weather conditions, even heavy icing conditions, and present venting practices, and devices, do not permit the desired versatility of regulator mounting, particularly in the recreational vehicle art utilizing liquified petroleum gas.

BRIEF SUMMARY OF THE INVENTION

It is an object of the invention to provide a vent cover for the neck of gas pressure regulators which may be selectively oriented to the regulator neck in a variety of positions wherein the vent cover may be positioned for each orientation of installation in that manner which will assure venting regardless of weather conditions, even heavy icing.

An additional object of the invention is to provide a gas pressure regulator vent cover which is of an economical construction, which may be mounted upon the neck of a pressure regulator without requiring extensive modification to the pressure regulator, which is easy to install, attractive in appearance and will maintain effective venting.

In the practice of the invention the vent cover is utilized with regulators having a generally cylindrical tubular vented neck which is internally threaded and provided with an open end defined by an edge perpendicularly disposed to the neck axis. The vent cover is mounted upon the open end of the vented neck by means of a threaded cap, and the vent cover is rotatably positionable about the neck axis.

When the regulator is installed the neck axis is normally disposed in a substantially horizontal direction, and the vent cover includes a large vent opening which is positioned downwardly when the vent cover is installed on the regulator. As the vent opening faces downwardly, dirt, water, and ice which may contact the vent cover do not enter the vent opening, and as the regulator neck includes a vent passage communicating with the interior of the vent cover, an effective regulator venting is achieved.

The regulator neck end edge may be provided with notches which cooperate with a detent formed on the vent cover such that the vent cover may be positioned in any one of four 90° positions on the neck.

Preferably, the vent cover is formed of a synthetic plastic material which is molded of several parts, and assembled mechanically or by adhesives. The vent cover is of an economical construction, and the vent cover body is of a generally U-shaped configuration having a large open end which is provided with a screen through which venting occurs.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
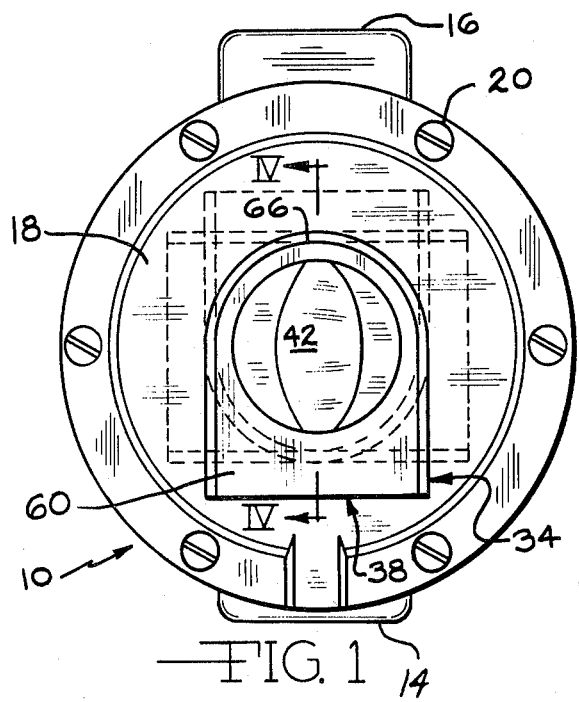
FIG. 1 is a front view of a regulator having a vent cover in accord with the invention mounted thereon, various preselected positions of the vent cover being illustrated in dotted lines.

With reference to FIGS. 1–4, a typical gas pressure regulator 10 of simplified construction is illustrated. The type of illustrated regulator is that type commonly utilized with recreational vehicles to control the gas pressure supplied from liquid petroleum storage tanks, and the illustrated regulator is commercially available as manufactured by the assignee, Progressive Dynamics, Inc., of Marshall, Mich., Model PD-5. The regulator 10 includes a housing 12, having an end face 14 in which an inlet port, not shown, is defined, and the housing end face 16 includes an outlet port, not shown. The diaphragm cover plate 18 is mounted upon the housing 12 by a plurality of screws 20, and the cover plate includes a neck 22 extending therefrom for housing a compression spring which bears upon the control diaphragm, as is conventionally known, as shown in U.S. Pat. No. 2,937,658.

Figure 3:
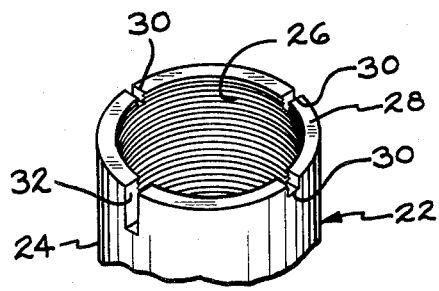
FIG. 3 is an enlarged, detail perspective view of a regulator neck end illustrating the vent passage and detent receiving notches formed therein.

The regulator neck 22 is of a tubular configuration having the generally cylindrical outer surface 24, and is internally threaded at 26, FIG. 3. The end of the neck is open, and is defined by a circular end edge 28 having a radial thickness corresponding to the thickness of the neck. The plane of the neck end edge 28 is perpendicular to the axis of the neck 22, and as will be appreciated from FIG. 3, the neck may be provided with a plurality of radially extending detent receiving notches 30, and a vent passage notch 32. The notches 30 and 32 are disposed at 90° with respect to each other about the axis of the neck 22, and the vent passage notch 32 extends in an axial direction several times greater than the axial dimension of the detent receiving notches 30, for a purpose which will be later described.

The regulator 10 is vented through the neck 22, and this venting requires that the interior of the neck adjacent the end edge 28 be in communication with the interior of the regulator on the side of the regulator diaphragm not normally exposed to the gas pressure. This is the regulator structure enclosed by the diaphragm plate 18 and the venting permits proper diaphragm operation. It will be appreciated from the aforementioned patents that the use of an elongated neck is common in the gas pressure regulator art.

A vent cover 34 in accord with the invention is mounted upon the open end of the regulator neck 22. Basically, the vent cover constitutes a hollow body having an interior chamber 36 which communicates with the interior of the neck regardless of the angular orientation of the vent cover about the neck axis. The vent cover 34 includes a vent opening 38, and a screen 40 is located within the cover adjacent the vent opening whereby vented gas passes through the screen, and the screen prevents insects and debris from entering the neck. The vent cover is maintained on the ends of the neck by a threaded cap 42 having a threaded stem 44 which mates with the threads 26 defined on the interior of the neck, and a lip defined on the cap engages the vent cover to firmly locate the vent cover in the desired orientation relative to the neck.

Figure 8:
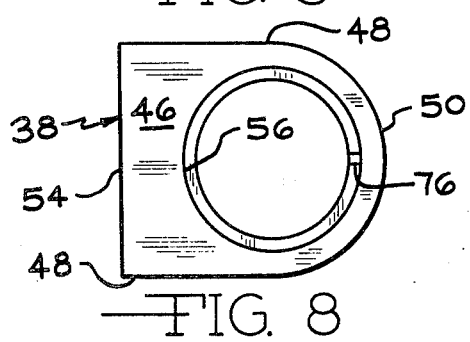
FIG. 8 is a bottom plan view of the vent cover, per se.
Figure 7:
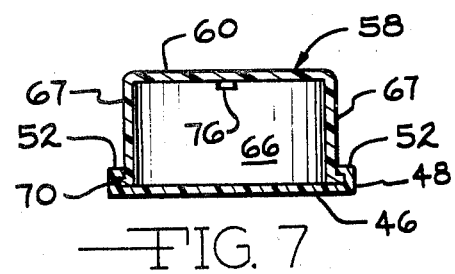
FIG. 7 is a sectional, elevational view taken through the vent cover as along section VII—VII of FIG. 5, the regulator neck not being illustrated.

The vent cover 34 includes an inner wall portion 46 of a configuration best appreciated from FIGS. 7 and 8. The inner wall is provided along its parallel lateral edges 48, and its convex edge 50, with an overlapping flange 52 which cooperates with the side wall of the vent cover as will be later appreciated. The linear end edge 54 of the inner wall defines a portion of the vent opening 38, and a circular opening 56 is formed in the inner wall concentric to edge 50 and of a diameter slightly greater than the diameter of the regulator neck surface 24, as will be appreciated from FIG. 4.

The vent cover body also includes a combined outer wall and a side wall portion 58. The outer wall 60 is of a planar configuration having a circular opening 62 defined therein, which is coaxial with the inner wall opening 56, in the vent cover assembled form. The outer wall is formed with a linear edge 64, and side walls depend from the outer wall 60 to form a U-shaped side wall having a convex base portion 66, parallel leg portions 67, and the side wall is open as defined by the leg edges 68. The free end of the side wall is formed with a flange 70 which cooperates with the inner wall with a flange 52, FIG. 7, whereby the inner wall portion 46 and the combined outer wall and side wall portion 58 may be mechanically interlocked together, as described below. The vent cover inner wall 46 is provided with a rib 72, FIG. 4, adjacent the edge 54, and the outer wall 60 and side wall portions 67 are provided with screen locating ridges 74, FIG. 4, whereby the screen 40 may be located within the vent cover body intermediate the inner, outer and side walls, as will be appreciated from FIG. 6. During assembly the screen 40 is located between ridges 74 and rib 72 provides an interference which permits the three components to be snapped together with the flanges 52 and 70 interlocking and held together by the rib 72.

Upon the inner surface of the outer wall 60 a detent boss 76 of rectangular configuration is formed, FIGS. 4 and 8, for selective reception within a neck notch 30 or 32, as will be later described.

Figure 2:
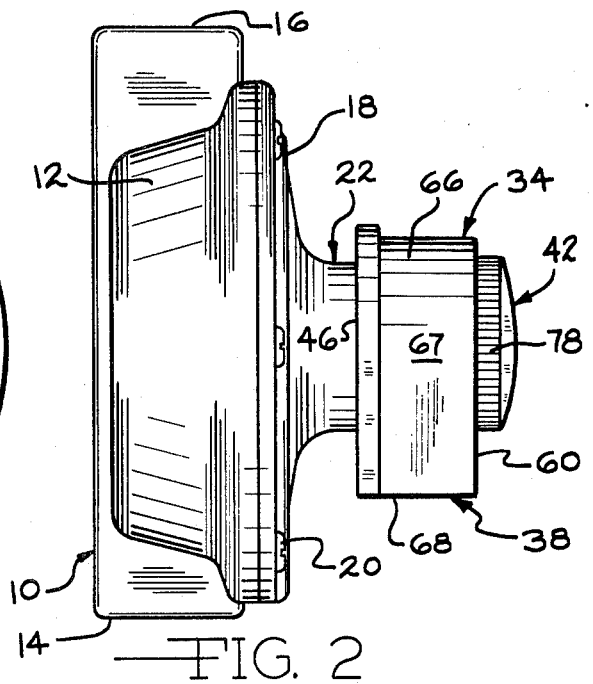
FIG. 2 is a side elevational view of the regulator and vent cover shown in FIG. 1 as taken from the left side thereof.

The vent cover 34 is attached to the regulator neck 22 by the cap 42. The cap 42 includes a threaded stem 44 of such dimension as to be received by the regulator neck threads 26, and the cap further includes an enlarged head 78 defining a lip 80, FIG. 4. The outer edge of the cap head may be knurled or ribbed to permit ease of rotation, as shown in FIG. 2.

Figure 5:
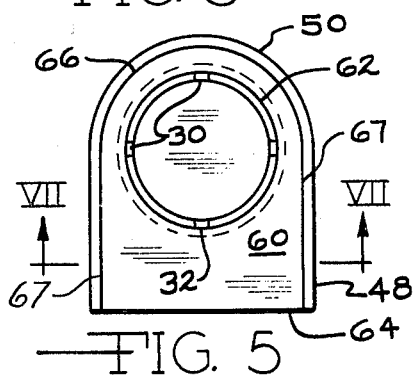
FIG. 5 is a top view of the vent cover as mounted on the regulator neck, the attachment cap being removed for purposes of illustration.

The vent cover is installed on the regulator neck 22 by inserting the regulator neck through the inner wall opening 56. The regulator is then rotated on the neck until the vent opening 38, as defined by the edges 54, 64 and 68, is disposed downwardly, as shown in FIGS. 1 and 2. When the regulator 10 is installed it will normally be installed in such a manner that the axis of the neck 22 will be disposed substantially horizontally, and it will be appreciated that the vent opening 38 may readily be positioned in a downward direction. Upon such orientation being achieved the vent cover outer wall 60 is positioned on the neck end edge 28 such that the detent boss 76 is received within the uppermost notch 30 or 32. Of course, it is to be appreciated that the notches 30 and 32 are oriented upon the neck 22 in a quadrant manner as will be appreciated from FIG. 5 wherein the regulator neck is in the same position as shown in FIG. 1. Thus, when the vent opening 38 is positioned downwardly, the detent boss 76 will be received in the "uppermost" notch.

The diameter of the outer wall opening 62 is greater than the inner diameter of the neck 22, but less than the outer diameter of the neck. Thus, as will be apparent from FIG. 5, the edge of the opening 62 is located upon the neck end edge 28, and the threading of the cap stem 44 into the neck concentrically locates the opening 62 with respect to the neck, and the cap lip 80 will engage the outer surface of the outer wall 60, FIG. 4, and as the cap lip overlaps the periphery of the opening 62, tightening of the cap will force the outer wall 60 into firm engagement with the neck end edge 28 and firmly position the vent cover on the regulator neck.

The axial length of the cap threaded stem 44 is less than the axial length of the neck notch 32 whereby the notch 32 constitutes a vent passage from the interior of the neck to the interior chamber 36 of the vent cover. Thus, regardless of the angular orientation of the vent cover upon the regulator neck, gas may be vented from the neck through the notch 32 into the vent cover, and through the screen 40 into the atmosphere. Of course, rather than utilizing the enlarged notch 32, a hole could be drilled in the neck within the neck axial portion located between the vent cover walls 46 and 60 to provide venting.

Figure 4:
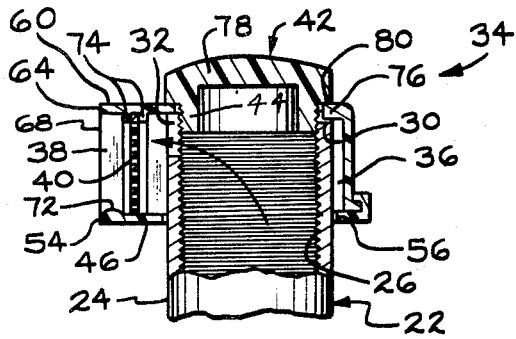
FIG. 4 is a reduced scale, diametrical elevational sectional view taken through the regulator neck and vent cover along section IV—IV of FIG. 1.

As appreciated from FIG. 4, the screen 40 is recessed "inwardly" from the wall edges 54, 64 and 68 whereby those portions of the walls from their edges to the screen constitute a shield of the screen aiding in preventing foreign matter from accumulating on the screen.

Preferably, all of the components of the vent cover, including the cap, are formed of a synthetic plastic material which is noncorrodable and not adversely affected by weather conditions. The vent cover 34 and cap 42 may be readily produced at low cost and high volume on ejection molding apparatus.

Figure 6:
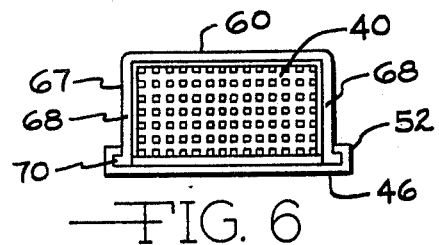
FIG. 6 is a bottom view of the vent cover, per se, illustrating the screen.

The dotted lines of FIG. 1 indicate the alternative mounting positions of the vent cover on the regulator, and such alternative positions are utilized depending on the mounting orientation of the regulator 10. In each instance of regulator installation the vent cover is disposed downwardly such that rain and ice will not accumulate on the vent opening 38, or obstruct the opening. As appreciated from FIG. 6, the vent opening 38, and screen 40, are preferably of a width equal to the spacing of the side walls 67, which is greater than the diameter of the regulator neck, and the vertical dimension of the opening as shown in FIG. 6, is equivalent to the spacing between the inner and outer walls 46 and 60. Thus, the large vent opening provided, and the use of the relatively large screen, substantially eliminates the likelihood of vent obstruction. Further, the U-shaped configuration of the vent cover aids in shedding rain, and under icing conditions ice may accumulate on the vent cover, but as long as the vent opening 38 is disposed downwardly the shielded and recessed location of the screen prevents accumulation of water and ice on the screen, and tests have indicated that the venting of the vent cover remains operative under the most severe icing conditions.

Of course, it is not necessary that the neck 22 have notches 30 therein, nor is the use of the detent boss 76 required. These components may be eliminated, which permits an infinite angular orientation of the vent cover with respect to the neck axis, and even when the detent boss is utilized, the vent cover 34 may be mounted upon a regulator which is obliquely related to the horizontal so that the notches 30 and 32 are not related horizontally and vertical, although the preferred coplanar relationship between the neck end edge 28 and outer wall 60 would not be achieved.

It is understood that various modifications to the inventive concept may be apparent to those skilled in the art without departing from the spirit of the invention.

I claim:

1. A gas pressure regulator vent cover for regulators having an internally threaded vented neck, in combination, a hollow body having inner and outer walls interconnected by a side wall, a first neck-receiving opening defined in said inner wall, a second neck-engaging opening defined in said outer wall coaxial with said first opening of a diameter slightly less than the diameter of the associated regulator neck, a vent opening defined in said side wall, and a cap having a threaded stem receivable within said second opening and a lip concentric to said stem of a diameter greater than the diameter of said second opening adapted to engage said outer wall adjacent said second opening.

2. In a gas pressure regulator vent cover as in claim 1 wherein said side wall is of a U-configuration having an arcuate base portion, leg portions and an open end, said open end defining said vent opening.

3. In a gas pressure regulator vent cover as in claim 2 wherein said side wall open end is defined by linear edges defined on said inner, outer and side walls lying in a common plane, and a gas pervious screen mounted in said body disposed between said inner, outer and side walls and located between said openings and said open end defining linear edges.

4. In a gas pressure regulator vent cover as in claim 3 wherein said screen is recessed inwardly of said linear edges whereby the portions of said inner, outer and side wall between said screen and the associated linear edge define a shield for said screen.

5. In a gas pressure regulator vent cover as in claim 1 wherein said inner, outer and side walls are formed of a synthetic plastic material, said inner wall comprising a first molded part and said outer wall and side wall comprising a second molded part, and cooperating interconnecting flanges defined on said parts for assemblying said parts for forming said body.

6. In combination, a gas pressure regulator having a tubular, vented, substantially cylindrical neck having an axis and terminating in an open end defined by a circular end edge transversely disposed to the neck axis, threads defined in said neck adjacent said end edge, a vent passage defined in said neck, a vent cover mounted upon said neck for selective rotational orientation to said neck about said axis, said cover comprising a hollow body communicating with said vent passage, a vent opening defined in said body having an axis and flow path transversely disposed to said neck axis, and threaded attachment means threaded into said neck through said open end engaging said body and selectively fixing said body to said neck whereby said vent opening may be oriented to said neck as desired.

7. In a combination as in claim 6, detent receiving means defined on said neck end edge, and a detent defined on said vent cover body selectively engageable with said detent-receiving means to orient said body about said neck axis in a predetermined position, said attachment means maintaining engagement of said detent with the associated detent-receiving means.

8. In a combination as in claim 6 wherein said body includes spaced inner and outer walls interconnected by a side wall, a first circular opening defined in said inner wall of a diameter slightly larger than the diameter of the neck at the location on the neck spaced from the neck end edge a distance equal to the spacing between said inner and outer walls, a second circular opening defined in said outer wall concentric with the axis of said first opening and of a diameter less than the diameter of the neck at the end edge and greater than the internally threaded diameter of the neck at the end edge, said vent opening being defined in said side wall, said attachment means comprising a cap having a threaded stem for threaded engagement with the neck internal threads and a lip having a diameter greater than the diameter of said second opening whereby said cap locates the vent on the regulator neck with the neck extending through said first opening and the edge of said second opening engaging the neck end edge overlapped by said cap lip.

9. In a combination as in claim 8 wherein said side wall is of a U-configuration having an arcuate base portion, leg portions and an open end, said open end defining said vent opening.

10. In a combination as in claim 9 wherein said side wall open end is defined by linear edges defined on said inner, outer and side walls lying in a common plane, and a gas pervious screen mounted in said body disposed between said inner, outer and side walls and located between said openings and said open end defining linear edges.

11. In a combination as in claim 10 wherein said screen is recessed inwardly of said linear edges whereby the portions pf said inner, outer and side walls between said screen and the associated linear edge define a shield for said screen.

12. A gas pressure regulator vent cover for use with a gas regulator having an elongated, tubular, internally threaded, vented neck of a circular cross section having an axis, an end edge lying in a plane perpendicular to the neck axis and a vent passage defined therein adjacent the end edge, in combination, a hollow body having spaced inner and outer walls interconnected by a side wall, a first circular opening defined in said inner wall of a diameter slightly larger than the diameter of the vent neck at the location on the neck spaced from the neck end edge a distance equal to the spacing between said inner and outer walls, a second circular opening defined in said outer wall concentric with the axis of said first opening and of a diameter less than the diameter of the neck at the end edge and greater than the internally threaded diameter of the neck at the end edge, a vent opening defined in said side wall, and a threaded cap having a threaded stem for threaded engagement with the neck internal threads and a lip having a diameter greater than the diameter of said second opening whereby said cap locates said body on the regulator neck with the neck extending through said first opening and the edge of said second opening engaging the neck and edge overlapped by said cap lip, the neck vent passage communicating with the interior of said hollow body and said hollow body being selectively rotatably oriented about the neck axis and fixed to the neck in predetermined orientation thereto by tightening of said cap.

13. In a gas pressure regulator vent cover as in claim 12, wherein said vent opening defined in said side wall comprises a rectangular outlet having a maximum dimension greater than the diameter of the neck adjacent the neck end edge and a minimum dimension substantially corresponding to the spacing between said body inner and outer walls.

14. In a gas pressure regulator vent cover as in claim 13 wherein said vent opening is formed by edges defined on said body inner, outer and side walls, and a gas pervious screen located within said body within said vent opening and located inwardly of said edges.

15. In a gas pressure regulator vent cover as in claim 14 wherein said vent opening forming edges are linear and lie in a common plane.

* * * * *